Figure 1:
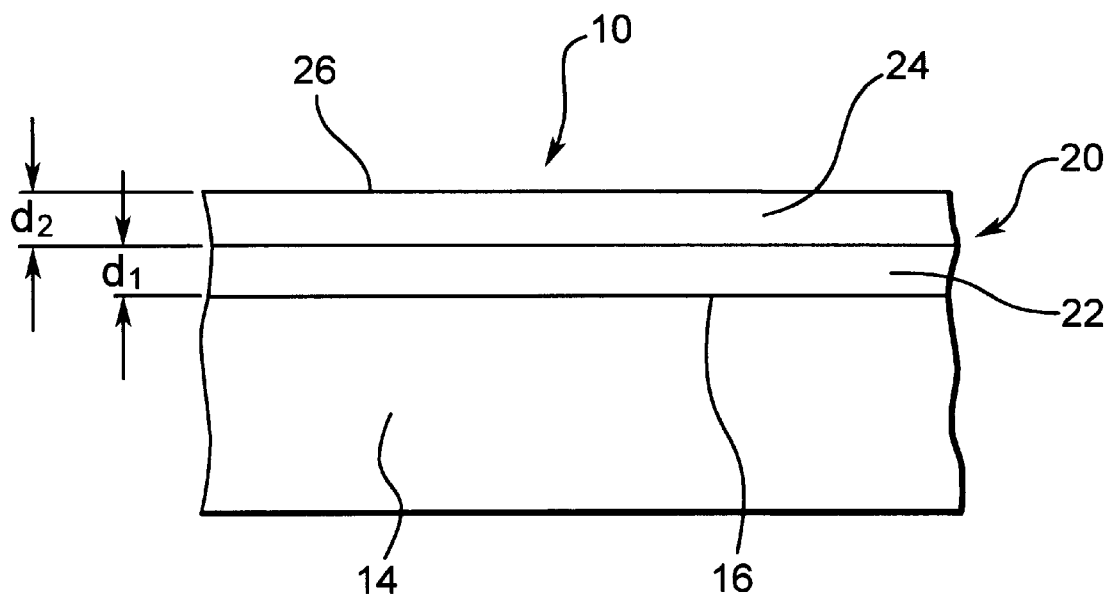

United States Patent
Gillich

[11] Patent Number: 6,067,189
[45] Date of Patent: May 23, 2000

[54] ALUMINUM REFLECTOR WITH COMPOSITE REFLECTIVITY-ENHANCING SURFACE LAYER

[75] Inventor: Volkmar Gillich, Neuhausen, Switzerland

[73] Assignee: Alusuisse Technology & Management, Ltd., Neuhausen am Rheinfall, Switzerland

[21] Appl. No.: 09/320,564

[22] Filed: May 27, 1999

Related U.S. Application Data

[62] Division of application No. 08/876,332, Jun. 6, 1997, Pat. No. 5,978,133.

[30] Foreign Application Priority Data

Jun. 28, 1996 [EP] European Pat. Off. ............... 96810430

[51] Int. Cl.$^7$ ............... G02B 5/08; G02B 5/28; G02B 1/11; F21V 7/22
[52] U.S. Cl. ............... 359/359; 359/584; 359/884
[58] Field of Search ............... 359/359, 360, 359/838, 888, 884, 584, 585; 205/188, 189, 190, 324–332; 427/162

[56] References Cited

U.S. PATENT DOCUMENTS 4,737,246 4/1988 Powers et al. ............... 205/116
5,623,375 4/1997 Floch et al. ............... 359/871
5,760,981 6/1998 Gillich ............... 359/883

OTHER PUBLICATIONS

Herve G. Floch et al, "Optical Coatings Prepared From Colloidal Meida", Thin Solid Films, No. 1 pp. 173–178, Aug. 1989.

*Primary Examiner*—Jon Henry
*Attorney, Agent, or Firm*—Fisher, Christen & Sabol

[57] ABSTRACT

Reflector having a composite reflectivity-enhancing layer as reflecting surface layer on a reflector body where the said composite layer has an outer layer facing the radiation to be reflected, the HI-layer, with a refractive index $n_2$ and, between the reflector body and the outer layer, an LI-layer with a refractive index $n_1$ which is smaller than $n_2$ and the LI and HI layers are $\lambda/4$ layers. The HI-layer is a sol-gel layer and the optical layer thickness $d_{opt,1}$ of the LI layer and $d_{opt,2}$ of the HI layer are such that $$d_{opt,i} = d_i \cdot n_i = l_i \cdot \lambda/4 \pm 20 \text{ nm}, i=1 \text{ or } 2$$

where $d_1$ represents the thickness of the LI layer in nm, $d_2$ the thickness of the HI layer in nm, $\lambda$ the average wavelength in nm of the light striking the reflector surface and $l_1$, $l_2$ are uneven natural numbers. The LI layer is a barrier layer of aluminium oxide made by anodising, or a sol-gel layer.

21 Claims, 1 Drawing Sheet

ALUMINUM REFLECTOR WITH COMPOSITE REFLECTIVITY-ENHANCING SURFACE LAYER

This application is a divisional application of U.S. Ser. No. 08/876,332, filed on Jun. 6, 1997, now U.S. Pat. No. 5,978,133.

The present invention relates to a reflector having a composite reflectivity-enhancing layer as reflecting surface layer on a reflector body where the said composite layer has an outer layer facing the radiation to be reflected, the HI-layer, with a refractive index $n_2$ and between the reflector body and the outer layer an LI-layer with a refractive index $n_1$ which is smaller than $n_2$ and the LI and HI layers are $\lambda/4$ layers. The invention also relates to the use of such reflectors with reflectivity enhancing composite layer and to a process for its manufacture.

Reflectors featuring a composite layer system comprising LI/HI-layers deposited on aluminium (LI/HI=Low Refraction Index/High Refraction Index)—i.e. layers exhibiting an inner layer with refractive index $n_1$ (LI) and an outer layer with a refractive index $n_2$ which is greater than $n_1$—are in general known as reflectors with surface layers that enhance reflectivity.

Such reflectors are nonnally produced by depositing a very thin layer of high purity aluminium onto the reflector body e.g. of glass or technical grade aluminium (i.e. aluminium of lower purity) e.g. by means of PVD (physical vapour deposition) methods such as sputtering or vaporisation. The high purity Al layer is then protected by depositing on it an LI protective layer e.g. made of $Al_2O_3$, or $SiO_2$, usually by PVD or CVD (chemical vapour deposition) methods, and enhanced by a further HI layer to provide a LI/HI reflectivity-enhancing surface on the reflector.

Because of the small thickness of the layer, it is generally not possible to anodise PVD Al layers; consequently, the deposition of the LI and HI layers by PVD or CVD methods is normally carried out under high vacuum. In order to achieve high reflectivity characteristics with composite layers that improve reflectivity, it is necessary to achieve good homogeneity and to keep exactly to narrow, exactly predefined tolerances in the thickness of the individual layers. Keeping closely to the exact thickness tolerances of oxide layers deposited in light vacuum using PVD or CVD methods, and checking the thicknesses of these layers is difficult and requires complicated, expensive equipment. The rate of deposition of CVD or PVD layers, especially such dielectric layers, depends on the method used and—compared with chemical methods—is relatively low. In view of the high cost of high-vacuum deposition units, this leads to high manufacturing costs. Furthermore, the low deposition rates and the necessity to use high-vacuum equipment for the PDV or CVD processes makes it difficult or even impossible to produce the layers in a continuous manner.

A further possibility for manufacturing composite layers providing reflectivity-enhancing composite layers is to use chemical or anodic oxidation of aluminium surfaces and subsequently to deposit a dielectric layer with a higher refractive index than aluminuim. For that purpose one reflectors made of aluminum or reflectors with a layer of aluminium which is thick enough for anodising. Anodising is normally performed in a sulphuric acid electrolyte using direct current (dc anodising). By choosing the appropriate parameters the resultant LI layer can be a homogeneous layer with predefined later thickness but normally exhibits high porosity which is a result of the process itself. The deposition of the HI layer is normally carried out using PVD or CVD methods. Such reflectivity enhancing composite layers may be produced e.g. in a strip process.

The object of the present invention is the preparation, at favourable cost, of reflectors with reflectivity-enhancing composite layers, in particular for technical lighting purposes, whereby the above mentioned disadvantages of the state of the art reflectors are avoided and, in particular, are suitable for continuous production in a strip process.

That objective is achieved by way of the invention in that the HI layer is a sol-gel layer and the optical layer thickness $d_{opt,1}$ of the LI layer and $d_{opt,2}$ of the HI layer are such that $$d_{opt,i} = d_i \cdot n_i = l_i \lambda/4 \pm 20 \text{ nm}, i=1 \text{ or } 2$$

where $d_1$ represents the thickness of the LI layer in nm, $d_2$ the thickness of the HI layer in nm, $\lambda$ the average wavelength in nm of the light striking the reflector surface and $l_1$, $l_2$, uneven natural numbers.

It must be taken into account that the refractive index n, i.e. $n_1$ or $n_2$, —because of the dispersion of the light—is a function of the wavelength i.e. in the present text $_1$ and $n_2$ always refer to the corresponding wavelength of the light striking the reflector surface. Furthermore, it must be taken into account that the condition $d_i n_i = l_i \lambda/4$, i=1 or 2 to obtain a reflectivity-enhancing composite layer is completely valid only for electromagnetic radiation striking the reflector surface vertically.

The LI/HI multiple layers are usually made up of at least two layers with different refractive indices. The combination of a pair of dielectric layers of different refractive index on a metal surface—in which the layer with the lower refractive index is situated on the surface of the reflector body—allows better reflectivity properties to be obtained than with a single horngeneous layer. For a given layer composition the highest reflectivity can be achieved if the optical layer thickness of the individual layers amounts to $\lambda/4$ or an uneven multiple thereof. With respect to the composition of the layer materials, the best reflectivity characteristics are achieved when the difference in the refractive indices of the individual layers is as great as possible.

The reflector according to the invention, which exhibits an HI sol-gel layer as an essential feature of the invention, offers advantages over the known, state of the art reflectors in that such HI layers can be deposited economically with the required constant thickness, their adhesion to the LI layer can be optimised readily e.g. by choice of the appropriate crosslinking agent i.e. without restricting the freedom of choice of other components that determine the refractive index of the HI layer, a large range of commercially obtainable, highly transparent sol-gel layers is already available, and the sol-gel layers in general exhibit very good behaviour with respect to levelling out the surface.

By properly choosing the composition of the sol for the sol-gel layer, in particular the crosslinking agent, the viscosity of the sol can be readily optimised for a given thickness of sol-gel layer. Furthermore, in general, sol-gel layers exhibit good resistance to scratching and good formability, it being possible to optimise these properties by the choice of composition of the sol-gel layer. In general, sol-gel layers can also be deposited readily using PVD, which also allows any other desired layers to be deposited on die free surface of the HI layer—e.g. semi-transparent layers.

A significant advantage of the reflectors according to the invention is, however, the replacement of PVD or CVD HI layers by sol-gel HI layers, as a result of which the reflectors according to the invention can be produced completely on cost-fivourable strip-coating units.

The reflector body required for the reflector according to the invention is preferably of pure aluminium or an aluminium alloy.

The aluminium body may be part of a component, e.g. a section, beam or another form of components, a plate, strip, sheet or a foil of aluminium, or may be an aluminium outer layer of a composite material, in particular an aluminium outer layer of a composite panel, or an aluminium layer deposited e.g. electrolytically on any material of choice. In a preferred version, the reflective body bearing the aluminium layer concerns a component made of aluminium which has been manufactured e.g. by rolling, extrusion, forging or press-forming. The reflector body containing the aluminium layer may also be shaped by bending, deep-drawing, cold press-forming or the like.

In the present text the term aluminium is to be understood to include all grades of purity of aluminium and all commercially available aluminium alloys. For example, the term aluminium includes all rolling, wrought, casting, forging and extrusion alloys of aluminium. Usefully, the aluminium layer is of pure aluminium having a purity level of 98.3 wt. % or more or aluminium alloys made with this purity grade and containing at least one of the elements Si, Mg, Mn, Cu, Zn or Fe. The aluminium layer of pure aluminium exhibits e.g. a purity of 98.3 wt. % and higher, usefully 99.0 wt. % and higher, preferably 99.9 wt. % and higher, especially 99.95 wt. % and higher.

Besides aluminium of the above mentioned purities, the aluniiniumn layer may also contain 0.25 to 5 wt. %, especially 0.5 to 2 wt. % magnesium, or 0.2 to 2 wt. % manganese, or 0.5 to 5 wt. % magnesium and 0.2 to 2 wt. % manganese, especially e.g. 1 wt. % magnesium and 0.5 wt. % manganese, or 0.1 to 12 wt. %, preferably 0.1 to 5 wt. % copper, or 0.5 to 5 wt. % zinc and 0.5 to 5 wt. % magnesium, or 0.5 to 5 wt. % zinc, 0.5 to 5 wt.9) magnesium and 0.5 to wt. % copper, or 0.5 to 5 wt. % iron and 0.2 to 2 wt. % manganese, in particular e.g. 1.5 wt. % iron and 0.4 wt. % manganese.

The surface of the reflector body may have any desired shape and may, if desired, be also be structured. In the case of rolled reflector body surfaces, these may e.g. be treated by high gloss or designer rolls. A preferred application for structured reflector body surfaces is e.g. for reflectors for daylight lighting where in particular structured surfaces exhibiting structural features of the order of 0.1 to 1 mm are employed.

Essential to the invention is that the HI layer is a sol-gel layer. Sol-gel layers are understood here as are layers manufactured by a sol-gel process. Sol-gel layers are e.g. xero-gels. Preferred for the production of the sol-gel layers required for the reflectors according to the invention are lyosols, whereby lyosols may be organosols or lydrosols. Preferred are organosols. The gel layer—in the following sol-gel layer—required for the reflectors according to the invention is formed e.g. by coagulation.

Also preferred for the production of the sol-gel layers are sols i.e. colloidal solutions, in which one of the following oxides or a mixture of the following oxides is dispersed in a fully divided form in a fluid medium.

The HI layer preferably comprises or contains oxides of alkali meals e.g. Li, alkaline earth metals e.g. Mg, Ca, Sr, Ba and/or transition metals such as e.g. Sc, Ti, V, Cr, Mn, Fe, Co, Ni, Y, Zr, Nb, Mo, Te, Ru, Rh, Pd, Hf, Ta, W, Re, Os, Ir, Pt and/or lantianides such as e.g. La, Cc, Pr, Nd, Pm, Dy, Yb or Lu, etc. Preferred for the reflectors according to the invention, featuring III layers deposited in a sol-gel process, are HI layers of essentially titanium oxide (Ti-oxide) with a refractive index of approx. 2.5, praseodymium-Litanium oxide (PrTi-oxide), lanthanum-titanium oxide (LaTi-oxide), tantalum oxide (Ta-oxide), hafnium oxide (Hf-oxide), niobium oxide (Nb-oxide), Zin-oxide, Ce-cxide or an oxide of an alloy of the mentioned materials. Especially preferred are, however, HI layers comprising or containing $TiO_2$, Ta-oxide, PrTi-oxide or LaTi-oxide.

The Sol-gel layers are glassy in character. Sol-gel layers can be manufactured reproducibly with a given layer thickness. Furthermore, the sol-gel layers can be used as protective or passivation layers which protect the reflector surfaces against weathering or corrosion.

Further sol-gel layers contain e.g. polymerisation products from organically substituted alkoxy-siloxanes having the general formula;

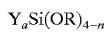

$$Y_aSi(OR)_{4-n}$$

where Y is e.g. a non hydrolisable monovalent organic group and R is e.g. an alkyl, aryl, alkaryl or aralkyl group and n is a natural number from 0 to 3. If n is equal to 1 or 2, R may be a $C_1$–$C_4$ alkyl group. Y may be a phenyl group, n equal to 1 and R a methyl group.

In another version the sol-gel layer may be a polymerisation product of organically substituted alkoxy-compounds having the general formula:

$$X_nAR_{4-n}$$

where A represents Si, Ti, Zr or Al, X represents HO—, alkyl-O— or Cl—, R represents phenyl, alkyl, alkenyl, vinylester or epoxyether and n the number 1, 2 or 3. Examples of phenyl are unsubstituted phenyl, or mono- , di- or tri-substituted $C_1$–$C_9$-alkyl-substituted phenyl, for alkyl, equally methyl, ethyl, propyl, iso-propyl, n-butyl, pentyl etc., for alkenyl —CH=$CH_2$, allyl, 2-methylallyl, 2-butenyl etc., for vinylester —$(CH_2)_3$—O—C(=O)—C(—$CH_3$)=$CH_2$ and for epoxy-ether —$(CH_2)_3$—O—$CH_2$—CH(—O—)$CH_2$.

Such sol-gel layers with polymerisation products of organically substituted alkoxyl compounds are, to advantage, deposited by a sol-gel process directly or indirectly onto the surface of the reflector body or onto the free surface of the LI layer. For that purpose e.g. alkoxides and halogen-silanes are mixed and hydrolised and condensed in the presence of water and suitable catalysts,. After removing the water and the solvent, a sol forms and may be deposited on the surface to be coated by immersion, centrifugal means, spraying etc., whereby the sol Lransforiis into a gel film e.g. under the influence of temperature and/or radiation. As a rule silanes are employed to form the sol; it is also possible to replace the silanes partially by compounds containing titanium, zirconium or aluminium instead of silicon. This enables the hardness, density and the refractive index of the sol-gel layer to be varied. The hardness of the sol-gel layer may also be controlled by employing different silanes e.g. by forming an inorganic network to control the hardness and thermal stability, or by employing an organic network to control the elasticity. A sol-gel layer which may be categorised between inorganic and organic polymers can be deposited on the surface to be coated via the sol-gel process by hydrolysis and condensation of alkoxides, mainly those of silicon, aluminium, titanium or zirconium. In the process an inorganic network is formed and additionally, via appropriately derivatised silicic acid-esters, it is possible to incorporate organic groups which may he employed for functionalising and for forming defined organic polymer systems. Further, the sol-gel film may be deposited by electroimmersion coating after the principle of catepliroetic precipitation of an amine and organically modified ceramic.

The HI layer may also be a sol-gel layer made up of two or more sab-layers. The HI layer may thereby be made up of a plurality of sub-layers of different composition and refractive indices. Essential in that respect is that each sub-layer exhibits a higher refractive index than that of the LI layer.

With regard to the thickness of the LI/HI layers, it was found in the course of the activities concerning the invention that the properties of reflectivity run essentially periodically and namely such that with increasing layer thickness—in particular layers with an optical layer thickness $d_{opt,i}$ greater than 6 $\lambda/4$—the reflection properties are unsuitable for technical lighting purposes. Preferred therefore are layers with an optical layer thickness less than $6\lambda/4$ and in particular such with $l_1$ and $l_2$ equal to 1 or 3.

Also, was found that reflectors with LI/HI layer thicknesses lying in the thickness range $d_i \cdot n_i = l_i \cdot \lambda/4 \pm 20$ nm (i=1 or 2) exhibit essentially the same good reflection properties so that the layer thicknesses $d_i$ do not have to comply exactly with the condition $d_i \cdot n_i = l_i \cdot \lambda/4$, i=1 or 2.

Over the whole of the reflector surface, therefore, the LI and Hi layers exhibit a constant thickness that does not vary by more than $\pm 20$ nm. The thicknesses $d_1$ of the LI layer and $d_2$ of the HI layer are preferably between 30 and 350 nm, in particular between 40 and 120 nm.

Highly preferred is for the thicknesses $d_1$ and $d_2$. measured at any particular spot not to differ by more than $\pm 5\%$ from the average layer thicknesses $d_{1av}$ and $d_{2\ av}$ over the whole of the composite layer.

Also preferred is for the thicknesses of the LI and HI layers to be selected such that the optical layer thicknesses of the LI and HI layers satisfy the equation $$d_{opt,i} = d_i \cdot n_i = l_i \cdot \lambda/4 \pm 20 \text{ nm}, i=1 \text{ or } 2$$

for a wavelength corresponding to the average wavelength best perceived by the human eye in daylight conditions, which is approximately 550 nm. The thicknesses of the LI and HI layers are chosen in particular such that the above equation holds for their optical layer thicknesses for wavelengths of $\lambda=550$ nm $\pm 200$ nm.

In order that constructive interference can take place and in order that the absorption of the electromagnetic radiation to be reflected is as small as possible, the composite layer must be as transparent as possible to the radiation to be reflected and must be pore-free. The latter requirement, apart from minimising absorption of light, also contributes to avoiding uncontrollable diffuse scattering of light. By pore-free is not to be understood absolutely pore-free. Important in that respect is that the porosity of the composite layer is less than 1%. The composite layer with such LI/HI layers preferably exhibits an absorption of incident light energy amounting to less than 3%.

The LI layer is preferably a barrier layer of aluminium oxide formed by anodising or an LI sol-gel layer.

The production of an LI layer of aluminium oxide by way of anodising requires e.g. a clean aluminium surface i.e. normally, prior to anodising, the aluminium surface which is to be oxidised electrolytically must be subjected to a surface treatment, a so called pre-treatment.

The aluminium surfaces usually exhibit a naturally occurring oxide layer which, frequently because of their previous history etc. is contaminated by foreign substances. Such foreign substances may for example be residual rolling lubricant, oils for protection during transportation, corrosion products or pressed in foreign substances and the like. In order to remove such foreign substances, the aluminium surfaces are normally pre-treated chemically with a cleaning agent that produces some degree of attack by etching. Suitable for this purpose—apart from aqueous acidic degreasing agents—are in particular alkaline degreasing agents based on polyphosphate and borate. A cleaning action smith moderate to strong removal of material is achieved by caustic or acidic etching using strongly alkaline or acidic pickling solution, such as e.g. caustic soda or a mixture of nitric acid and hydrofluoric acid. In that cleaning process the natural oxide layer is removed and along with it all the contaminants contained in it. When using strongly attacking alkaline pickling solutions, a pickling deposit often forms and has to be removed by an acidic after-treatment. A surface treatment without removing surface material is a degreasing treatment which may be performed using organic solvents or aqueous or alkaline cleaning agents.

Depending on the condition of the surface, it may also be necessary to remove surface material using mechanical means. Such a surface treatment may be performed e.g. by grinding, surface blasting, brushing or polishing, and if desired may be followed by a chemical after-treatment.

In the blank metallic state aluminium surfaces exhibit a very high capacity to reflect light and heat. The smoother the surface, the greater is the directional reflectivity and the brighter the appearance of the surface. The highest degree of brightness is obtained with high purity aluminium and special alloys such as e.g. AlMg or AlMgSi alloys.

A highly reflective surface is obtained e.g. by polishing, milling, by rolling with highly polished rolls in the final pass, by chemical or electrolytic polishing, or by a combination of the above mentioned surface treatment methods. The polishing may be performed using cloth wheels with soft cloth, if desired using a polishing paste. When polishing with rolls it is possible to introduce a given structure to the surface of the aluminium using engraved or etched steel rolls or by placing some means exhibiting a given structure between the rolls and the material being rolled. Chemical polishing is performed e.g. using a highly concentrated acid mixture normally at high temperatures of around 100° C. Acidic or alkaline electrolytes may be employed for electrolytic brighitening; normally acidic electrolytes are preferred.

At least the part of the reflector body bearing the aluminium layer to be oxidised is then placed in an electrically conductive liquid, the electrolyte, and connected up as the anode to a direct current source, the negative electrode normally being of stainless steel, graphite, lead or aluminium.

The electrolyte is made such that, during the anodising process, the aluminium oxide formed does not re-dissolve, i.e. no re-solution of the aluminium oxide takes place. In the dc field, gaseous hydrogen forms at the cathode and gaseous oxygen at the anode. The oxygen forming at the aluminium surface reacts with the aluminium and forms an oxide layer on it which becomes increasingly thicker in the course of the process. As the resistance of the layer increases rapidly with increasing thickness of the barrier layer, the flow of current drops accordingly and the growth of the layer comes to a halt.

Manufacturing LI and layers electrolytically enables the layer thicknesses to be controlled precisely. The maximum thickness of the aluminium oxide barrier layer corresponds approximately in nanometres (nm) to the voltage in volts (V) applied i.e. the maximum thickness of layer obtained is a linear function of the anodising voltage, whereby the voltage drop in the outer layer has to be taken into account. The exact value of the maximum layer thickness obtained as a function of the applied direct voltage U, taking into account the voltage drop in the outer layer, can be determined by a simple trial and lies between 1.2 and 1.6 nm/V, whereby the exact value of layer thickness as a function of the applied voltage depends on the electrolyte employed i.e. its composition and temperature.

Accordingly the minimum applied voltage $U_{min}$ in volts is:

$$d_1/1.6 \leq U_{min} \leq d_1/1.2$$

where $d_1$ represents the thickness in nm of the LI layer with refractive index $n_1$ which has to satisfy the following relationship $$d_1 \cdot n_1 = l_1 \cdot \lambda/4 \pm 20 \text{ nm}$$

In order to take into account the change in voltage drop as a function of time, the applied anodising voltage may be raised continuously or in steps throughout the anodising process. The optimum anodising voltage or the optimum change in anodising voltage and the duration of anodising may be determined in a simple trial beforehand or via reflectivity measurements made during the anodising process.

The electrolytic oxidation may be carried out in a single process step by applying a predetermined anodising voltage, or continuously or in a series of steps in which the anodising voltage is raised to a predetermined level or to a level which is determined by measuring the optimum reflectivity characteristics. The electrolytic oxidation play, however, he performed in a series of steps i.e. in a series of process steps, e.g. employing different anodising voltages.

Preferred is a process in which the reflectivity characteristics of the composite layer ate measured continuously and the anodising voltage U in volts, starting from $U_A$ the initial voltage according to the relationship $$d_1/1.6 \leq U_A \leq d_1/1.2$$

is increased continuously or in a series of steps until the measured reflectivity has reached a desired minimum.

By using a non-redissolving electrolyte, the aluminium oxide barrier layers are almost pore-free, i.e. any pores resulting e.g. from contaminants in the electrolyte or structural faults in the aluminium surface layer, but only insignificantly due to dissolution of the aluminium oxide in the electrolyte.

LI layers manufactured in this manner have an exactly prescribed layer thickness, are pore-free, homogeneous and transparent to electromagnetic radiation, especially that in the visible and /or infra-red range.

Useable as non-redissolving electrolytes in the process according to the invention are e.g. organic or inorganic acids, as a rule diluted with water, having a pH of 2 and more, preferably 3 and more, especially 4 and more and 7 and less, preferably 6 and less, especially 5.5 and less. Preferred are electrolytes that function cold i.e. at room temperature. Especially preferred are inorganic or organic acids such as sulphuric or phosphoric acid at low concentration, boric acid, adipinic acid, citric acid or tartaric acid, or mixtures thereof, or solutions of ammonium or sodium salts of organic or inorganic acids., especially the mentioned acids and mixtures thereof. In that connection it has been found that the solutions preferably contain a total concentration of 20 g/l or less, usefully 2 to 15 g/l of ammonium salt or sodium salt dissolved in the electrolyte. Especially preferred are solutions of ammonium salts of citric or tartaric acidic or sodium salts of phosphoric acid.

A very highly preferred electrolyte contains 1 to 5 wt. % tartaric acid to which may be added e.g. an appropriate amount of ammonium hydroxide ($NH_4OH$) to adjust the pH to the desired value.

The electrolytes are as a rule aqueous solutions.

The maximum possible anodising voltage is determined by the dielectric strength of the electrolyte. This is dependent for example on the electrolyte composition and temperature, and normally lies in the range of 300 to 600 V.

The optimum electrolyte temperature for the anodising process depends on the electrolyte employed—is, however, of lesser importance for the quality of the LI layers obtained. Temperatures of 15 to 40° C., especially 18 to 30° C., are employed for the anodising process.

The dielectric constant $\epsilon_1$ of such an LI layer depends, among other things, on the process parameters employed during anodising. The dielectric constant $\epsilon_1$ of the LI layer according to the invention lies between 6 and 10.5 at 20° C., preferably between 8 and 10.

The aluminium oxide barrier layer acting as LI layer usefully has a refractive index $n_1$ between 1.55 and 1.65.

In a further preferred version the LI layer is a sol-gel layer. The LI sol-gel layer is preferably comprised of or contains aluminium oxide or silicon oxide. In another version the LI sol-gel contains or is comprised of one of the oxides already mentioned for the HI sol-gel layer, the sol-gel material for the LI layer being selected such that the difference in refractive index is as great as possible with respect to that of the HI layer.

The LI layer may also be a sol-gel layer comprising two or more sub-layers. Thereby, the LI layer may also be made up of a plurality of sub-layers differing with respect to composition and refractive index. Essential in that respect is that each sub-layer exhibits a lower refractive index than that of the HI layer.

The present invention includes also reflectors with a composite reflectivity-enhancing layer in which the composite reflectivity-enhancing layer is built up of a plurality of LI/HI composite layers lying on top of each other, the various LI/HI composite layers each being made up of the same materials with the same refractive indices or, the composite reflectivity-enhancing layer may feature a plurality of LI/HI composite layers of different materials with various refractive indices.

An advantage of reflectors with a sol-gel layer as LI layer over those with an LI oxide layer produced by anodising is that the chemical composition of the reflector body is unimportant, i.e. reflector bodies of impure and cheap materials may be employed. Further, the choice of reflector body materials is not restricted by their ability to be anodised, i.e. for example one could also employ plastics as reflector body material.

Further advantageous forms of reflectors according to the invention are described in the subclaims.

The reflectors according to the invention find preferred use in technical lighting applications or as reflectors for infra-red or uv-radiation. A highly preferred application for the reflectors according to the invention is in lamps for lighting technology especially for daylight lighting applications, especially functional lamps such as lamps in work places using computer screen monitors, secondary lighting lamps, scanning lamps or as lighting elements, illuminated ceilings or light deflecting channels.

The process according to the invention relates to the above described production of reflectors with an LI layer in the form of a barrier layer made by anodising and a subsequently deposited sol-gel layer as HI layer. The corresponding process is suitable for producing a reflectivity-enhancing composite layer either continuously or individually on strips, sheets, foils or parts made of aluminium, and on composite materials having, at least one outer layer of aluminium.

A further process relates to the production of the reflectivity-enhancing composite layer in a continuous strip process, e.g. using a continuous production line. The continuous production line comprises essentially either of a strip anodising unit for producing a LI barrier layer by anodising and a coating unit for producing the HI sol-gel layer, or else of a single or multiunit coating line for LI and HI sol coating with after treatment facilities for transforming the sol layers to gel layers.

The LI and HI layers of the composite layer according to the invention are of only small thickness so that the variation in thickness compared to the wavelength of incident electromagnetic radiation is very small; consequently any selective absorption of light or irridescence is negligible.

reflectivity are obtained by subtracting the scattered radiation from the total reflectivity. The bright aluminium surfaces are of aluminum having a purity of 99.90 wt %. The surface quality of the bright aluminium surface is the same for all three types of reflector. The reflectivity values in table 1 were obtained according to DIN 5036; each represents a technical lighting value i.e. the measured reflectivity values are expressed in terms of light sensitivity of the human eye. As can be seen from the listed values, the total reflectivity and the directional reflectivity are both improved by the reflectivity-enhancing composite sol-gel layers according to the invention. Table 1 also shows details of the optical quality of the reflector surfaces detected by the eye viz., with regard to streakiness and iridescence; these details show e.g. that any unevenness present on the surface is smoothed out by applying the sol-gel layers according to the invention.

|  | Al 99.9/045/AN Strip-anodised dc/H$_2$SO$_4$ layer; | Al 99.9/Barrier layer Sol-gel (TiO$_2$) | Al 99.9/Sol-gel(SiO$_2$) Sol-gel (TiO$_2$) |
| --- | --- | --- | --- |
| Total reflection | 88% | 93% | 95% |
| Scattered reflection | 7% | 5% | 5% |
| Streakiness | visible | none | none |
| Iridescence | visible | none | none |

FIG. 1 is a schematic of the cross-sectional structure of the reflector of the invention.

In FIG. 1, the reflector 10 includes a reflector body 14 of metal and a composite reflectivity-enhancing layer 20 facing the surface 16 of the reflector body 14 and consisting of an outer HI-layer 24 with a refractive index $n_2$ and an outer surface 26 facing the radiation to be reflected and between the reflector body 14 and the HI-layer 24 an LI-layer 22 with a refractive index $n_1$ which is smaller than $n_2$. The LI-and HI-layers are $\lambda/4$-layers and the HI-layer 24 is a sol-gel layer containing or consisting of a polymerization product of organically substituted alkoxy compounds. Referring to FIG. 1, $d_1$ represents the thickness of the LI-layer 22 and $d_2$ represents the thickness of the HI-layer 24.

EXAMPLE

A bright aluminium surface of 99.90 wt% Al is provided with a composite reflectivity-enhancing layer; its reflectivity properties are compared with the surface properties of a bright aluminium surface having only a dc/H$_2$SO$_4$-oxide layer (an oxide layer produced by anodising with direct current in a sulphuric acid electrolyte).

The following table shows the comparison of the typical reflectivity properties, especially the respective fractions of directional and scattered reflected radiation. Shown in the first column are the values obtained with a strip anodised aluminium surface having an approximately 1.5 to 2.0 μm dc/H$_2$SO$_4$-oxide layer; the second column shows the values obtained with a bright aluminium surface having an approximately 80 nm thick barrier layer on which an additional, sol-gel layer, essentially of TiO$_2$ has been deposited. Listed in the third column are the values obtained with a bright aluminium surface which has an approx. 120 nm thick LI sol-gel layer containing essentially SiO2 and an HI sol-gel layer containing essentially TiO$_2$. The HI sol-gel layer containing essentially TiO$_2$ is produced by depositing a titanium-butylate solution as a sol. the values of directional

What is claimed is:

1. A reflector having a composite reflectivity-enhancing layer as a reflecting surface layer on a reflector body where the reflector body is a metal, where the said composite layer has an outer layer facing the radiation to be reflected, the HI-layer, with a refractive index $n_2$, and, between the reflector body and the outer layer, an LI-layer with a refractive index $n_1$ which is smaller than $n_2$ and the LI and HI layers are $\lambda/4$ layers, the HI layer is a sol-gel layer containing or consisting of a polymerization product of organically substituted alkoxy compounds and the optical layer thickness $d_{opt,1}$ of the LI layer and $d_{opt,2}$ of the HI layer are such that:

$$d_{opt,l}=d_l.n_l=l_l.\lambda/4\pm20 \text{ nm, } l=1 \text{ or } 2$$

where $d_1$ represents the thickness of the LI layer in nm, $d_2$ the thickness of the HI layer in nm, $\lambda$ the average wavelength in nm of the light striking the reflector surface and $l_1$, $l_2$ are uneven natural numbers, the thickness $d_1$ of the LI layer and the thickness $d_2$ of the HI layer are each between 30 and 350 nm, and are such that the thickness $d_1$ and $d_2$ measured at a particular site does not vary by more than ±5 percent from the average values of $d_{1av}$ and $d_{2av}$ over the whole of the composite layer.

2. The reflector according to claim 1, wherein the quotient $n_1/n_2$ lies between 0.5 and 0.7.

3. The reflector according to claim 1, wherein the composite reflectivity-enhancing layer has a porosity of less than 1 percent.

4. The reflector according to claim 1, wherein the composite layer absorbs less than 3 percent of the incident light energy.

5. The reflector according to claim 1, wherein the reflector body or at least the surface layer of the reflector body that has to be provided with the composite layer is of aluminum or aluminum alloy.

6. The reflector according to claim 5, wherein the aluminum is pure aluminum having a purity of 98.3 weight percent Al and higher.

7. The reflector according to claim 5, wherein the aluminum is an aluminum alloy having an aluminum content of 98.3 weight percent and higher and containing at least one of the elements Si, Mg, Mn, Cu, Zn and Fe.

8. The reflector according to claim 5, wherein the LI layer is a transparent and pore-free barrier layer produced by anodizing the aluminum layer and having a dielectric constant $\epsilon_1$ of 6 to 10.5 at 20° C.

9. The reflector according to claim 1, wherein the LI layer is a sol-gel layer and comprises a silicon oxide, aluminum oxide or an oxide of an alkali, alkaline earth or transition metal, a lanthanide or an alloy of these materials, or mixtures of the mentioned oxides, or a metal fluoride.

10. The reflector according to claim 1, wherein the LI layer is a sol-gel layer and is a polymerization product of organically substituted alkoxy compounds.

11. A process comprising using the reflectors according to claim 1 as reflectors for lamps for technical lighting applications.

12. A process comprising using the reflectors according to claim 1 as reflectors for lamps for daylight technical lighting applications.

13. A process comprising using the reflectors according to claim 1 as reflectors for infra-red radiation.

14. A process comprising using the reflectors according to claim 1 as reflectors for UV radiation.

15. A process comprising using the reflectors according to claim 1 as reflectors for secondary lighting lamps.

16. A process comprising using the reflectors according to claim 1 as reflectors for lamps operated in conjunction with computer screen monitors in work places.

17. A process comprising using the reflectors according to claim 1 as reflectors for scanning lamps.

18. A process comprising using the reflectors according to claim 1 as reflectors for lighting elements.

19. A process comprising using the reflectors according to claim 1 as reflectors for illuminated ceilings.

20. A process comprising using the reflectors according to claim 1 as reflectors for light deflecting channels.

21. A process comprising using the reflectors according to claim 1 for reflecting electromagnetic radiation with a wavelength $\lambda$ corresponding to the average wavelength of visible light best perceived by the human eye in daylight.

* * * * *